United States Patent [19]

Messelt et al.

[11] 4,456,751
[45] Jun. 26, 1984

[54] MULTIPLE STAGE PROCESS FOR PREPARING MIXED HYDROXYALKYLCELLULOSE ETHERS

[75] Inventors: Christopher D. Messelt; Glenda P. Townsend, both of Baton Rouge, La.

[73] Assignee: The Dow Chemical Company, Midland, Mich.

[21] Appl. No.: 534,951

[22] Filed: Sep. 22, 1983

[51] Int. Cl.³ .......................................... C08B 11/193
[52] U.S. Cl. ...................................... 536/91; 536/90
[58] Field of Search ........................... 536/90, 91, 95

[56] References Cited

U.S. PATENT DOCUMENTS

| Re. 24,116 | 1/1956  | Klug            | 536/91 |
| 2,831,852  | 4/1958  | Savage          | 536/91 |
| 2,835,666  | 5/1958  | Savage          | 536/91 |
| 3,296,247  | 1/1967  | Klug            | 536/91 |
| 3,839,319  | 10/1974 | Greminger et al.| 536/91 |
| 4,096,325  | 6/1978  | Teng et al.     | 536/91 |
| 4,292,426  | 9/1981  | Orii et al.     | 536/95 |

FOREIGN PATENT DOCUMENTS

| 2372177 | 7/1978  | France         | 536/91 |
| 973952  | 11/1964 | United Kingdom | 536/91 |

*Primary Examiner*—Ronald W. Griffin

[57] ABSTRACT

Mixed hydroxyalkyl cellulose ethers are prepared in a multi-stage etherification process, for example, hydroxyethylmethylcellulose is prepared by reacting alkali cellulose sequentially with ethylene oxide, methyl chloride, ethylene oxide and methyl chloride to form a product having uniform substitution. Products made by this process have improved solubility and other properties.

9 Claims, No Drawings

MULTIPLE STAGE PROCESS FOR PREPARING MIXED HYDROXYALKYLCELLULOSE ETHERS

BACKGROUND OF THE INVENTION

This invention relates to a process for preparing cellulose ethers, particularly to a process of preparing mixed hydroxyalkylcellulose ethers.

In the preparation of cellulose ethers, substituent groups can often become attached to the cellulose molecule in various ways. For example, each repeating unit of the cellulose molecule contains one primary and two secondary hydroxyl groups all of which may be converted to ether groups. The properties of diverse cellulose ethers having similar amounts and types of substituent groups often vary depending on which of these hydroxyl groups become substituted.

When a cellulose ether having hydroxyalkyl substituents is prepared, the introduction of a hydroxyalkoxyl group to the cellulose molecule creates a new hydroxyl group which can itself be substituted. Thus, poly(alkylene oxide) chains often form in the preparation of hydroxyalkylcellulose ethers. Again, the properties of the cellulose ether will vary, often substantially, depending on how uniformly the hydroxyalkoxyl substituent group is distributed through the molecule. Because the formation of such side chains is generally random and unpredictable, it is difficult to obtain a hydroxyalkylcellulose ether wherein the hydroxyalkoxyl substituents are distributed relatively uniformly through the molecule. When mixed hydroxyalkylcellulose ethers are prepared, it is especially difficult to obtain uniform distribution of the hydroxyalkoxyl substituents throughout the molecule. It would, therefore, be desirable to have a process wherein mixed hydroxyalkylcellulose ethers are prepared having hydroxyalkoxyl substituents which are relatively uniformly distributed throughout the cellulose molecule.

SUMMARY OF THE INVENTION

This invention is such a process. This invention is a process for preparing "mixed hydroxyalkylcellulose ethers," said process comprising sequentially reacting alkali cellulose with (a) an alkylene oxide under conditions sufficient to attach a first portion of the amount of hydroxyalkyl groups to be attached to the molecule, (b) an etherifying agent which is different from the alkylene oxide employed in steps (a) and (c) and which reduces the formation of poly(alkylene oxide) chains, under conditions such that ether groups are attached to the cellulose, and (c) an alkylene oxide under conditions sufficient to attach a second portion of the amount of hydroxyalkyl groups to be attached the cellulose.

In preparing mixed hydroxyalkylcellulose ethers according to this invention, products having improved properties are obtained. In particular, products having more uniformly distributed hydroxyalkyl substitution are prepared in the practice of this invention. Products prepared by the process of this invention have desirable properties which make them especially useful in diverse applications such as thickeners for latex paints.

DETAILED DESCRIPTION OF THE INVENTION

For the purposes of this invention, the term "mixed hydroxyalkylcellulose ether" refers to a cellulose ether containing at least two different substituent groups, at least one of which is a hydroxyalkyl group.

Exemplary mixed hydroxyalkylcellulose ethers include hydroxyethylmethylcellulose, carboxymethylhydroxyethylcellulose, ethylhydroxyethylcellulose, hydroxyethyl hydroxypropylcellulose, hydroxyethyl hydroxypropylmethylcellulose, hydroxypropylmethylcellulose, hydroxyethylhydroxybutylcellulose, hydroxybutylmethylcellulose and the like.

Alkali cellulose is employed as a starting material in the process of this invention. The term "alkali cellulose" is used herein to designate a mixture of cellulose and a concentrated aqueous solution of an alkali metal hydroxide. Such alkali cellulose contains at least sufficient alkali metal hydroxide to catalyze the reaction of an alkylene oxide and to break up the crystalline structure of the cellulose. Generally, the alkali metal hydroxide is sodium hydroxide and is present in the alkali cellulose in the range of about 0.2 to about 4.0 moles per mole of cellulose pulp. Said cellulose pulp may be any of the commercially available pulps including those derived from wood, oat hulls and cotton linters. The preparation of alkali cellulose is generally conducted in the substantial absence of air or oxygen in order to reduce the oxidative degradation of the alkali cellulose. Generally, the subsequent etherifying reactions are also conducted in the substantial absence of air for the same purpose. However, it is sometimes desirable to employ reactive conditions which increase the oxidative degradation of the cellulose, such as when a low molecular weight product is desired.

In the process of this invention, alkali cellulose is reacted in a first reaction with an alkylene oxide. Preferably, the alkylene oxide is a $C_2$–$C_4$ alkylene oxide. More preferably, the alkylene oxide is ethylene oxide. This first alkylene oxide reaction is conducted under conditions sufficient to attach to the cellulose a first portion of that amount of the corresponding hydroxyalkoxyl substituent which is to be attached to the cellulose. The conditions employed to control the amount of hydroxyalkoxyl substitution in this first alkylene oxide reaction include, for example, the amount of alkylene oxide employed, the temperature of the reaction and the length of time of the reaction. Increasing any of these variables generally increases the amount of hydroxyalkoxyl substitution on the cellulose. Of these variables, the amount of alkylene oxide, temperature and length of time of reaction are most readily controlled. In this first alkylene oxide reaction from about 20 to 85 weight percent, preferably 30 to 60 weight percent of the amount of the hydroxyalkoxyl substituents to be added are advantageously attached to the cellulose.

The time and temperatures advantageously employed in this first alkylene oxide reaction depend somewhat on the particular alkylene oxide employed. In general, the higher alkylene oxides react more slowly than the lower alkylene oxides. For example, propylene oxide and butylene oxide react more slowly with alkali cellulose than does ethylene oxide and therefore, typically require longer reaction times and/or higher temperatures. In such propylene oxide or butylene oxide reactions, the temperature is advantageously about 50° to about 150° C., preferably 60° to 120° C., more preferably 60° to 90° C. A period of about 0.3 to 3.0 hours is usefully employed. When an ethylene oxide is used, the hydroxyethylation reaction is more highly exothermic and the temperature is more typically controlled to about 30° to about 80° C. by continuously adding ethylene oxide to the reaction mixture at a suitable rate.

The hydroxyalkylated material obtained in the first alkylene oxide reaction is then reacted with at least one etherifying agent which is different from the alkylene oxide employed in steps (a) and (c) of this process and which reduces the formation of poly(alkylene oxide) chains.

Such etherifying agent may be any etherifying agent having such characteristics, including alkylating agents such as alkyl halides or dialkyl sulfates; alkylene oxides different from those employed in steps (a) and (c) of this process, particularly those which form hydroxyalkoxyl substituents having a hydroxyl group which is less reactive than that contained by the hydroxyalkoxyl group formed in steps (a) and (c); halo-substituted aliphatic carboxylic acids or salts thereof; and like materials known to react with hydroxyl-containing organic compounds under alkaline conditions to form ether linkages. Of the foregoing, preferred are the alkyl halides, especially methyl- and ethyl chloride; alkylene oxides, particularly $C_3$-$C_4$ alkylene oxides, and chloroacetic acid or salts thereof.

While not intending to be bound by any theory, it is believed that etherifying agents which do not form hydroxyl-containing substituents (such as alkylating or carboxyalkylating agents) tend to react with the hydroxyl group on a previously attached hydroxyalkoxyl substituent, thereby preventing subsequent reactions between the hydroxyalkoxyl group and alkylene oxide molecules. When the etherifying agent is an alkylene oxide, the manner in which the formation of poly(alkylene oxide) chains is reduced is not fully understood.

As used herein, the term "alkylene oxide reaction" is used exclusively to designate the reactions corresponding to steps (a) and (c) of this invention as described hereinbefore. The reaction corresponding to step (b) of the process as described hereinbefore are called "etherification reactions" or "etherifying agent reactions" even if an alkylene oxide is employed therein. Similarly, the term "ether group" is employed herein to designate substituent groups which are attached to the cellulose during the etherification reaction, i.e., step (b). The substituent groups attached to the cellulose during the alkylene oxide reactions are referred to herein as "hydroxyalkoxyl groups."

All or part of the total amount of such ether group to be attached to the cellulose may be attached in the etherification agent reaction. However, except when only small amounts of such ether group are to be so attached, it is preferred to attach only a portion of such desired amount of ether groups to the cellulose in a first etherifying agent reaction, and to attach additional portion(s) thereof subsequent to second alkylene oxide reaction. In general, from about 20-85 percent of the total amount of other ether groups to be attached to the cellulose are attached in this first etherification reaction. The particular reaction conditions may vary somewhat according to the particular etherifying agent employed, but typically a temperature of 30°-120° C., preferably 50°-100° C., more preferably 55°-90° C., is suitable. The time employed in this first etherifying reaction is typically from about 0.1 to 1 hour but it is understood that the time required in this etherifying agent reaction will depend somewhat on the amount of such ether groups to be attached to the molecule as well as the temperature of the reaction and the particular etherifying agent employed.

After the first etherifying agent reaction, the alkali cellulose, now containing both hydroxyalkyl and other ether substituents, is reacted with an additional portion of alkylene oxide. In this second alkylene oxide reaction, the important variables, i.e., reaction time, reaction temperature, amount of alkylene oxide and etherifying agent employed are generally the same as in the first cycle of reactions. Preferably, the alkylene oxide reaction is conducted at about 40° to 90° C.

In its simplest form, then, the process of this invention requires that an alkylene oxide be contacted with the cellulose in at least two stages, which stages are separated by a reaction between the alkali cellulose and an etherifying agent as described hereinbefore.

If desired, the reaction between the alkali cellulose and the alkylene oxide can be carried out in three or more stages, provided that the successive stages are separated by an etherifying agent reaction. In general, the alkylene oxide may be advantageously reacted with the cellulose in up to about ten or more stages, but preferably, no more than five, more preferably no more than three such stages are employed. Each individual alkylene oxide reaction is advantageously conducted under the general conditions described hereinbefore, attaching in each stage a portion of the total amount of hydroxyalkoxyl substituents to be attached to the cellulose. Similarly, each successive etherifying agent reaction is advantageously conducted under the general conditions described hereinbefore, attaching in each stage a portion of the total amount of the corresponding ether groups to be attached to the cellulose. The final ethylene oxide reaction may be followed, if desired, with an additional etherification reaction. Such final etherification reaction is as described hereinbefore, desirable and generally preferable when the alkylene oxide is attached to the cellulose in only two stages.

Using the process of this invention, hydroxyethylmethylcellulose may be prepared by reacting alkali cellulose with, for example, ethylene oxide, then methyl chloride, and then additional ethylene oxide. Additional methyl chloride reactions may be conducted before the first ethylene oxide reaction or after the second ethylene oxide reaction, or both.

Hydroxyethylhydroxypropylcellulose may be prepared in accordance with this invention, for example, by reacting alkali cellulose sequentially with ethylene oxide, propylene oxide and ethylene oxide. Additional ethylene oxide and propylene oxide reactions may be employed as described herein.

Ternary ethers such as hydroxyethylhydroxypropylmethylcellulose may be prepared by reacting the alkali cellulose with ethylene oxide, a mixture of propylene oxide and methyl chloride, and then more ethylene oxide. Alternatively the reaction sequence may be: ethylene oxide, propylene oxide, ethylene oxide, methyl chloride. Still another useful reaction sequence is methyl chloride, ethylene oxide, propylene oxide and ethylene oxide.

It can be seen from the foregoing that the staged process of this invention can be carried out with a variety of reaction sequences. The invention is not intended to be limited to those reaction sequences specifically illustrated herein.

The amounts of hydroxyalkoxyl and other ether substitution attached to the cellulose in the first two cycles of reaction may be, if desired, less than the amounts of hydroxyalkyl and ether substitution to be attached. In such cases, one or more additional cycles of alkylene oxide and etherification reactions are carried out. Again, the conditions of such third or additional cycles of reactions are essentially the same as those employed in the first two cycles of reactions except that, of course, the amount of hydroxyalkyl or other ether substitutions attached to the molecule in each cycle will be proportionally smaller than when only two cycles are employed. While many such cycles may be employed, in general, no more than ten, preferably no more than five, more preferably no more than three, such cycles are employed. That is, following the first two cycles of reactions, between zero and eight additional cycles of reactions are generally conducted.

While the essential elements of the process of this invention are as described hereinbefore, some modifications of the foregoing process, which may be beneficially employed, are described as follows.

Additional increments of aqueous alkali metal hydroxide solution may be added to the reaction mixture at one or more stages during the aforementioned process. Typically, such additional increments of alkali metal hydroxide solution are added to the reaction mixture after an alkylene oxide reaction but before an etherification reaction. For example, the alkali cellulose employed as a starting material may contain sufficient alkali metal hydroxide to catalyze the alkylene oxide reaction and to reduce the crystallinity of the cellulose but not sufficient to permit the etherification reaction to run to completion. In such a case, an incremental amount of alkali metal hydroxide solution is beneficially added to the reaction mixture prior to the etherifying agent reaction. However, it is understood that such additional increments of alkali metal hydroxide are not considered critical to the present invention.

In another modification of the foregoing process, different etherifying agents may be employed in the diverse etherifying agent reactions. For example, methyl chloride may be employed as an etherifying agent in the first etherifying agent reaction and ethyl chloride may be the etherifying agent in subsequent etherifying agent reaction. In such an embodiment of this reaction, the product cellulose ether will have both methyl and ethyl substitution. Similarly, mixtures of etherifying agents may be employed in any etherification reaction.

In a further modification of the process of this invention, an alkylene oxide may be added to the reaction vessel simultaneously with an etherifying agent, provided that under the particular reaction conditions employed one of the alkylene oxide or the etherifying agent is highly reactive and the other is relatively nonreactive. For example, ethylene oxide is comparatively highly reactive with alkali cellulose at temperatures below 55° C. Methyl chloride, on the other hand, reacts more slowly with alkali cellulose at such temperatures. Thus, in the first cycle of alkylene oxide/etherifying agent reactions, methyl chloride and ethylene oxide can be added to the reaction vessel containing alkali cellulose at the same time at a temperature below that at which the methyl chloride will rapidly react with the alkali cellulose. The temperature of the reaction mixture may then be adjusted in the range of 40°–80° C. at which temperature the ethylene oxide will rapidly react and the methyl chloride does not react in significant amounts with the alkali cellulose. In such a process, following the completion of the ethylene oxide reaction, the temperature of the reaction mixture may be increased to about 60° to about 90° C. and methyl chloride allowed to react. It is understood that in this modification to the basic aforedescribed process, small amounts of methyl chloride will react with the alkali cellulose during the ethylene oxide reaction and small amounts of ethylene oxide will react with the alkali cellulose during the methyl chloride reaction. However, the modified process as described in this paragraph is considered to be a sequential reaction of an alkylene oxide and an etherifying agent for the purposes of this invention.

In another variation of the process of this invention, the alkylene oxide and etherification reactions may be carried out by adding the alkylene oxide or etherifying agent to the reaction mixture as a single increment or by the gradual addition of the alkylene oxide or etherifying agent during the course of the particular reaction. When particularly reactive alkylene oxide or etherifying agents such as ethylene oxide are employed, it is generally preferred to add the reactant gradually over the course of the particular reaction in order to control the temperature of the reaction.

In still another variation of this process, an etherification reaction may be conducted prior to the first alkylene oxide reaction.

In yet another modification of this process, the use of gaseous diluents containing small amounts of alkylene oxide or etherifying agent, such as are often employed in the so-called dry process for making cellulose ethers, is considered to fall within the scope of this invention.

The process of this invention may be conducted in a slurry in an inert diluent such as toluene, methyl ethyl ketone and the like, or as a dry process. Most advantageously, a dry process is employed. In a slurry process, salts and other by-products of the diverse reactions are removed following the completion of all reactions by washing the product with an appropriate solvent such as toluene, acetone, t-butanol, hexene, or isopropanol. In the so-called dry process, hot water-insoluble products are advantageously washed with hot water to remove residual impurities. Hot water-soluble products may be temporarily crosslinked under acidic conditions using a method such as is taught in U.S. Pat. No. 3,769,247 (incorporated herein by reference) to render them temporarily insoluble in water. The temporarily crosslinked material may then be washed with cold water to remove impurities.

The process of this invention is useful for the preparation of mixed hydroxyalkylcellulose ethers wherein improved uniformity of substitution is desired. In particular, this process is useful for the preparation of hydroxyethylmethylcellulose (HEMC). HEMC prepared by the process of this invention exhibits superior enzyme resistance and color acceptance as compared to comparable HEMC which is prepared in a conventional (i.e., nonmulti-staged) dry process. Because of this improved color acceptance and enzyme resistance, HEMC prepared according to the process of this invention are excellent thickeners for aqueous coating compositions such as latex paints. Other mixed hydroxyalkylcellulose ethers prepared according to the process of this invention are advantageously employed in those uses for which conventionally prepared hydroxyalkyl mixed cellulose ethers are employed.

The following example is provided to illustrate the invention but not to limit the scope thereof. All parts and percentages are by weight unless otherwise specified.

EXAMPLE 1

Alkali cellulose is prepared by spraying, in a pressure reactor under a nitrogen atmosphere, 24.1 pounds of sodium hydroxide (as a 50 weight percent aqueous solution) onto 30 pounds of finely divided cellulose pulp and thoroughly mixing. The temperature in the pressure reactor is adjusted to 60° C. and 24 pounds of ethylene oxide is continuously added to the reaction vessel at an average rate of about 0.35 pound per minute. Following the ethylene oxide addition, 3.6 pounds of methyl chloride are added to the reaction vessel and allowed to react with the alkali cellulose for 0.1 hour while maintaining the temperature in the reaction vessel at 60° C. Following the methyl chloride reaction, a second increment of 15 pounds of ethylene oxide is continuously added to the reaction vessel at a rate of 0.35 pound per minute, again maintaining the reaction temperature at 60° C. Following the ethylene oxide addition, a second increment of 8.4 pounds of methyl chloride is added to the reaction vessel and allowed to react at 60° C. for 0.1 hour, and at 80° C. for an additional 30 minutes. The resulting HEMC temporarily is crosslinked according to the method described in U.S. Pat. No. 3,769,247, subsequently is washed with water to remove residual by-products, dried and recovered.

The dried HEMC is analyzed for hydroxyethoxyl molar substitution (HEMS) and methoxyl degree of substitution (MDS) and found to have a HEMS of 2.56 and a MDS of 1.0. The color compatibility of the product HEMC in semi-gloss and flat latex paint formulation is measured according to the following procedure.

To one quart of a semi-gloss latex paint formulation is added, with mixing, 78.8 g of a 21 percent aqueous solution of the HEMC sample. To 24.5 g of the thickened paint is added 0.5 g of Tenneco Perma Cal Orange tint. A 7 mil drawdown of the tinted, thickened paint is made on a primed-unprimed Leneter 1B chart. A section of the wet painted surface is rubbed with the finger over both the primed and unprimed surfaces, until a decided resistance is felt. The paint is then allowed to dry and visually examined for flocculation of the pigments and colorants.

The foregoing test is repeated, this time using a flat interior latex paint formulation . The results of such testings are as reported in Table I following.

For comparison, HEMC Sample Nos. C-1, C-2 and C-3, which samples are prepared by a conventional dry process, are evaluated for color compatibility. The results are as given in Table I following.

EXAMPLE 2

Alkali cellulose is prepared by spraying in a pressure reactor under a nitrogen atmosphere, 12 pounds of a 50 weight percent aqueous sodium hydroxide solution onto 20 pounds of finely divided cellulose pulp and thoroughly mixing. The reaction mixture is heated to 60° C., and 13 pounds of ethylene oxide are continuously added to the reaction vessel at a rate of about 0.3 pound per minute. Following the ethylene oxide reaction, 8 pounds of methyl chloride are added to the reaction vessel and allowed to react for about 5-10 minutes while maintaining the temperature in the reaction vessel at 60° C. Following the methyl chloride reaction, 13 additional pounds of ethylene oxide are continuously added to the reaction vessel at a rate of about 0.3 pound per minute while maintaining the temperature in the reaction vessel at 60° C. An additional 8 pounds of methyl chloride are then added, and allowed to react at 60° C. for 5-10 minutes and at 80° C. for an additional 60 minutes.

The product is temporarily crosslinked using the process described in U.S. Pat. No. 3,769,247, washed with water, dried and recovered.

The product has a HEMS of 2.57 and a MDS of 0.97. The color compatibility and enzyme resistance of this product are evaluated as described in Example 1 and are reported as Sample No. 2 in Table I.

TABLE I

| Sample No. | HEMS[1] | MDS[2] | Color Compatibility[3] | Enzyme Loss[4] | | | |
|---|---|---|---|---|---|---|---|
| | | | | 7 | 14 | 21 | 28 |
| 1 | 2.56 | 1.0 | 1 | 5.4 | 10.8 | 9.9 | 13.2 |
| 2 | 2.57 | 0.97 | 3 | 1.7 | 12.5 | 19.1 | 16.0 |
| C-1* | 2.02 | 1.0 | 7 | 5.3 | 19.4 | 21.4 | 24.5 |
| C-2* | 2.86 | 0.94 | 5 | Not Determined | | | |
| C-3* | 2.91 | 0.96 | 5 | Not Determined | | | |

*Not an example of the invention.
[1]Hydroxyethyl molar substitution.
[2]Methoxy degree of substitution.
[3]Color compatibility determined as described in the example. Scale: 1 = excellent; 2-4 = good; 5-7 = acceptable; 8-10 = poor.
[4]Percent loss in viscosity of a latex paint component due to enzymatic degradation over the indicated time period measured in days.

As can be seen Sample Nos. 1 and 2 which are prepared according to the process of this invention have significantly better color acceptance than Sample Nos. C-1 through C-3 even though said Sample Nos. C-1 through C-3 have comparable hydroxyethoxyl and methoxyl substitutions. In addition, they are less degraded than Comparative Sample No. C-1.

What is claimed is:

1. A process for preparing mixed hydroxyalkyl cellulose ethers comprising sequentially reacting an alkali cellulose with (a) an alkylene oxide under conditions sufficient to attach to the cellulose a portion of the amount of hydroxyalkyl groups to be attached thereto, (b) an etherifying agent which is different from the alkylene oxide employed in steps (a) and (c) and which reduces the formation of poly(alkylene oxide) chains, under conditions such that ether groups are attached to the cellulose, and (c) an alkylene oxide under conditions sufficient to attach to the cellulose a second portion of the amount of hydroxyalkyl groups to be attached thereto.

2. The process of claim 1 wherein the alkylene oxide is ethylene oxide and the etherifying agent is an alkyl chloride.

3. The process of claim 1 wherein in step (a) 20-85 weight percent of the amount of hydroxyalkyl groups to be attached to the cellulose are attached thereto and step (b) 15-80 weight percent of the amount of ether groups to be attached to the cellulose are attached thereto and after attaching said second portion of hydroxyalkoxyl groups to the cellulose, the cellulose contains the entire amount of hydroxyalkoxyl groups to be attached thereto.

4. The process of claim 1 wherein in steps (a) and (c), the alkylene oxide is ethylene oxide and said ethylene oxide is added continuously to the alkali cellulose.

5. The process of claim 1 wherein steps (a) and (b) are conducted by simultaneously adding the alkylene oxide and etherifying agent to the alkali cellulose, reacting the alkali cellulose with the alkylene oxide under conditions such that the etherifying agent does not substantially react with the alkali cellulose and then reacting the etherifying agent with the alkali cellulose.

6. The process of claim 2 wherein the etherifying agent is methyl chloride and the mixed hydroxyalkyl cellulose ether is hydroxyethylmethylcellulose having a hydroxyethyl molar substitution of about 1.0 to about 4.0 and a methoxy degree of substitution of about 0.05 to about 1.0.

7. The process of claim 1 wherein after step (c), the alkali cellulose is contacted with an etherifying agent which is different from the alkylene oxide employed in steps (a) and (c), said contact being made under conditions such that ether groups are attached to the cellulose.

8. The process of claim 7 wherein the etherifying agent employed in step (b) is different from the etherifying agent contacted with the alkali cellulose following step (c).

9. The process of claim 1 wherein the etherifying agent is a halo-substituted aliphatic carboxylic acid.

* * * * *